United States Patent [19]

Yakuyama et al.

[11] Patent Number: 4,882,527
[45] Date of Patent: Nov. 21, 1989

[54] THREE-DIMENSIONAL MEASURING ROBOT

[75] Inventors: Takashi Yakuyama, Atsugi; Toshiaki Ueda, Hiratsuka, both of Japan

[73] Assignees: Nissan Motor Co., Ltd., Yokohama; Tokyo Boeki Ltd., Tokyo, both of Japan

[21] Appl. No.: 258,343

[22] Filed: Oct. 17, 1988

[30] Foreign Application Priority Data

Oct. 16, 1987 [JP] Japan .................................. 62-259466
Oct. 16, 1987 [JP] Japan .................................. 62-259468

[51] Int. Cl.$^4$ .............................................. G05B 19/42
[52] U.S. Cl. ............................... 318/568.13; 318/568.2
[58] Field of Search ......................... 318/568.13, 568.2

[56] References Cited

U.S. PATENT DOCUMENTS 4,529,921 7/1985 Moribe ............................ 318/568.13
4,633,414 12/1986 Yabe et al. .................... 318/568.2 X Primary Examiner—William M. Shoop, Jr.
Assistant Examiner—Saul M. Bergmann
Attorney, Agent, or Firm—Foley & Lardner, Schwartz, Jeffery, Schwaab, Mack, Blumenthal & Evans

[57] ABSTRACT

To facilitate teaching work in an orthogonal three-axis playback measuring robot having an orthogonal three-axis actuating mechanism including a main arm; a multijoint arm including at least one rotary arm and one pivotal arm attached to an end of the main arm; and a probe attached to an end of the multijoint, in particular, a number of manipulation switches are arranged on an end of the main arm of the actuating mechanism and on outer surfaces of the rotary and pivotal arms of the multijoint arm in such a way that each pair of two switches are so arranged as to correspond to two opposite straight, rotary or pivotal movement directions of each of the above various arms.

7 Claims, 4 Drawing Sheets

THREE-DIMENSIONAL MEASURING ROBOT

BACKGROUND OF THE INVENTION

1. Field of the Invention

The present invention relates to a three-dimensional measuring robot and more specifically to an improvement of robot teaching work efficiency in a three-dimensional playback measuring robot composed of an orthogonal three-axis actuating mechanism and a multijoint arm.

2. Description of the Prior Art

In order to measure a cubic shape of a mechanical part or a vehicle body, for instance, a teaching playback robot of three dimensional measurement type has been used. The three-dimensional playback measuring robot is usually composed of an orthogonal three-axis actuating mechanism having a horizontal main arm; a multijoint arm attached to an end of an horizontal main arm of the above actuating mechanism, and a probe attached to an end of the multijoint. When an object is measured by the above-mentioned three-dimensional teaching playback measuring robot, various measurement points and various routes at or to the measurement points are first taught to the robot by actuating or moving the orthogonal three-axis actuating mechanism and the multijoint having a probe, and then measurement points are automatically measured by playback method in accordance with the teaching data previously stored in the robot.

In the prior-art playback robot, conventionally, the above-mentioned teaching work is effected by manipulating a number of manipulation switches provided for a separate teaching control unit connected to the robot body via a cable. These manipulation switches are arranged so as to correspond to the movement directions of each of the various arms of the robot.

In the prior-art three-dimensional measuring robot, however, since the number of the robot arm members is large and also the robot arm movement in teaching work are rather complicated, there exist problems in that the teaching operator cannot easily understand the mutual relationship between the manipulation switches and the robot arm movements and further the switch manipulability is not high, so that the teaching work by use of the manipulation switches takes much time and therefore the teaching work efficiency is low. In addition, in the prior-art robot, since a relatively heavy control unit is installed separately from the main robot body, it has been necessary to carry the heavy control unit and to connect the control unit to the robot body through a cable before teaching work, thus further lowering the teaching work efficiency.

SUMMARY OF THE INVENTION

With these problems in mind, therefore, it is the primary object of the present invention to provide a three-dimensional measuring robot which is easy to understand the relationship between the manipulation switch and the robot arm motion and high in switch manipulability, without providing a separate teaching control unit, for providing an improved teaching workability.

To achieve the above-mentioned object, a three-dimensional measuring robot according to the present invention comprises: (a) an orthogonal three-axis actuating mechanisms having a main arm, for moving the main arm in three orthogonal directions; (b) a multijoint arm including at least one rotary arm and one pivotal arm and attached to an end of said orthogonal three-axis actuating mechanism; (c) a probe attached to an end of said multijoint arm, for detecting an object to be measured when brought into contact with the object; (d) a plurality of manipulation switches arranged on an end of the main arm of said orthogonal three-axis actuating mechanism and on outer surfaces of the rotary and pivotal arms of said multijoint arm; and (e) control means for storing data indicative of positions of the main, rotary and pivotal arms in teaching operation, when said probe is brought into contact with the object by use of said manipulation switches, and controlling movement of the plural arms on the basis of the stored data in playback operation.

The manipulation switches comprises a plurality of pairs of switches, each pair of switches being so arranged as to correspond to two opposite movement directions of each movable arm.

In the three-dimensional measuring robot according to the present invention, since various manipulation switches are arranged on an end of the main arm of the actuating mechanism and on outer surfaces of the rotary and pivotal arms of the multijoint arm in such a way that each pair of two switches are so arranged as to correspond to two opposite straight, rotary or pivotal movement directions of each of the above various arms, it is possible to facilitate teaching work in an orthogonal three-axis playback measuring robot.

DETAILED DESCRIPTION OF THE PREFERRED EMBODIMENTS

Embodiments of the present invention will be described hereinbelow with reference to the attached drawings.

Figure 1:
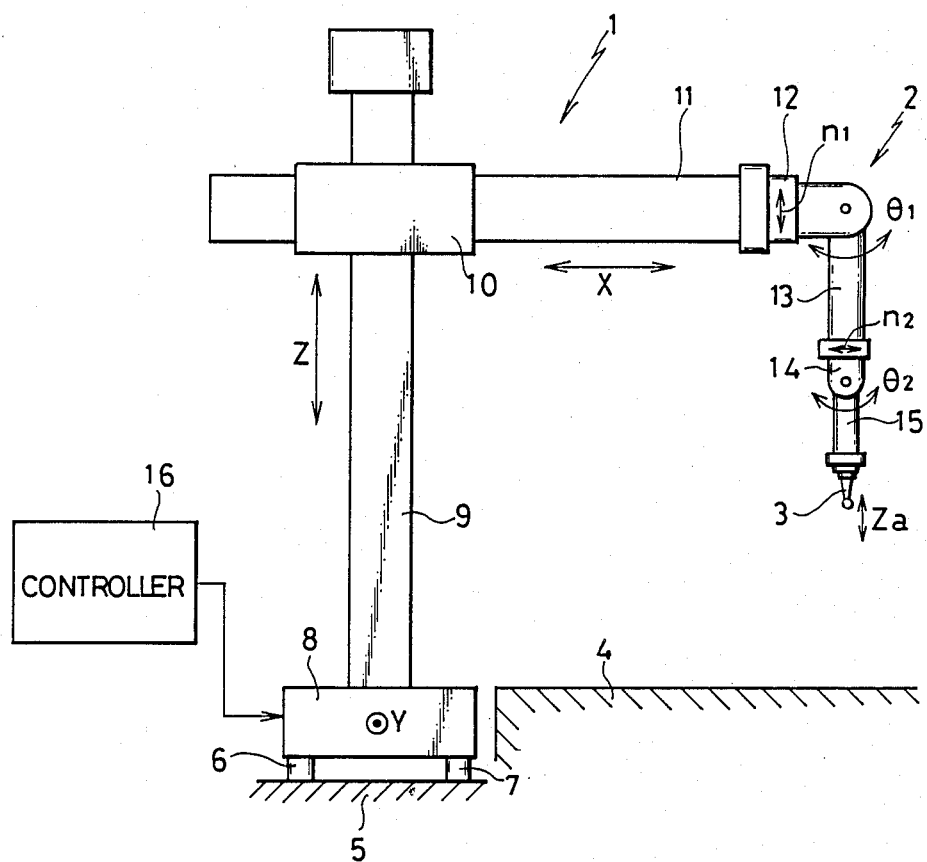
FIG. 1 is a diagrammatical view showing a three-dimensional measuring robot to which an embodiment of the present invention is applied.

FIG. 1 shows an example of three-dimensional measuring robots to which an embodiment of the present invention can be applied. In FIG. 1, the robot comprises roughly an orthogonal three-axis actuating mechanism 1, a multijoint arm 2, and a probe (sensor) 3.

The orthogonal three-axis actuating mechanism 1 is composed of a fixed base 5 arranged in parallel to the level of a surface plate 4 on which an object to be measured is mounted; a pair of rails 6 and 7 arranged on the upper surface of this fixed base 5 along the longitudinal direction thereof; a movable base 8 movably disposed on the rails 6 and 7; a column 9 vertically disposed on the movable base 8; a head body 10 vertically slidably coupled to the column 9, and a main arm 11 horizontally slidably supported by said head body 10. Therefore, when the main arm 11 is slidably moved passing through the head body 10, the probe 3 is moved in a first (e.g. X-axis) direction; when the movable base 8 is moved along the rails 6 and 7, the probe 3 is moved in a second (e.g. Y-axis) direction; and when the head boy 10 is slidably moved along the column 9, the probe is moved in a third (e.g. Z-axis) direction.

To move the main arm 11 to and fro in the X-axis direction along the head body 10, an ac three-phase servomotor is disposed within the head body 10 to drive via a reduction gear a pinion gear in mesh with a rack gear formed along the longitudinal direction of the main arm 11. To move the movable base 8 to and fro in the Y-axis direction on the rails 6 and 7, an ac three-phase servomotor is disposed on the movable base 8 to drive via a reduction gear a pinion gear in mesh with a rack gear formed along the longitudinal direction of the fixed base 5. To move the head body 10 up and down in the Z-axis direction along the column 9, an ac three-phase servomotor is mounted on top of the column 9 to drive via a reduction gear (also mounted on top of the column 9) a ball screw shaft disposed within the column 9 in mesh with a ball screw nut fixed to head body 10.

The multijoint arm 2 attached to an end of the main arm 11 comprises a first rotary arm 12 rotatably connected to the main arm 11 coaxially therewith; a first pivotal arm 13 pivotally connected to the first rotary ram 12; a second rotary arm 14 rotatably connected to the first pivotal arm 13 coaxially therewith; a second pivotal arm 15 pivotally connected to the second rotary arm 14; and a probe attached to the second pivotal arm 15.

A dc servomotor and a reduction gear are mounted on each of these arms to rotate or pivot the respective arm within a predetermined angular range.

In FIG. 1, a controller 16 including a computer is connected to the above-mentioned orthogonal three-axis actuating mechanism 1 and the multijoint arm 2 to controllably drive each movable arm member of the mechanism 1 and the multijoint arm 2. Further, the controller 16 measures a probe position by receiving detection signals generated from various displacement and angular sensors connected to each motor output shaft to indicate each arm displacement and angular position, whenever the probe 3 is brought into contact with a measurement point. The data indicative of the displacement and angular positions of the movable arms obtained when the probe 3 is brought into contact with an object to be measured are stored in this controller 16 in teaching operation, and thereafter the movements of the plural arms are controlled on the basis of the stored data in playback operation.

In the above-mentioned three-dimensional measuring robot, the first feature of the present invention is to provide various manipulation switches on or near each associated arm of the orthogonal three-axis actuating mechanism 1 and the multijoint arm 2.

Figure 2:
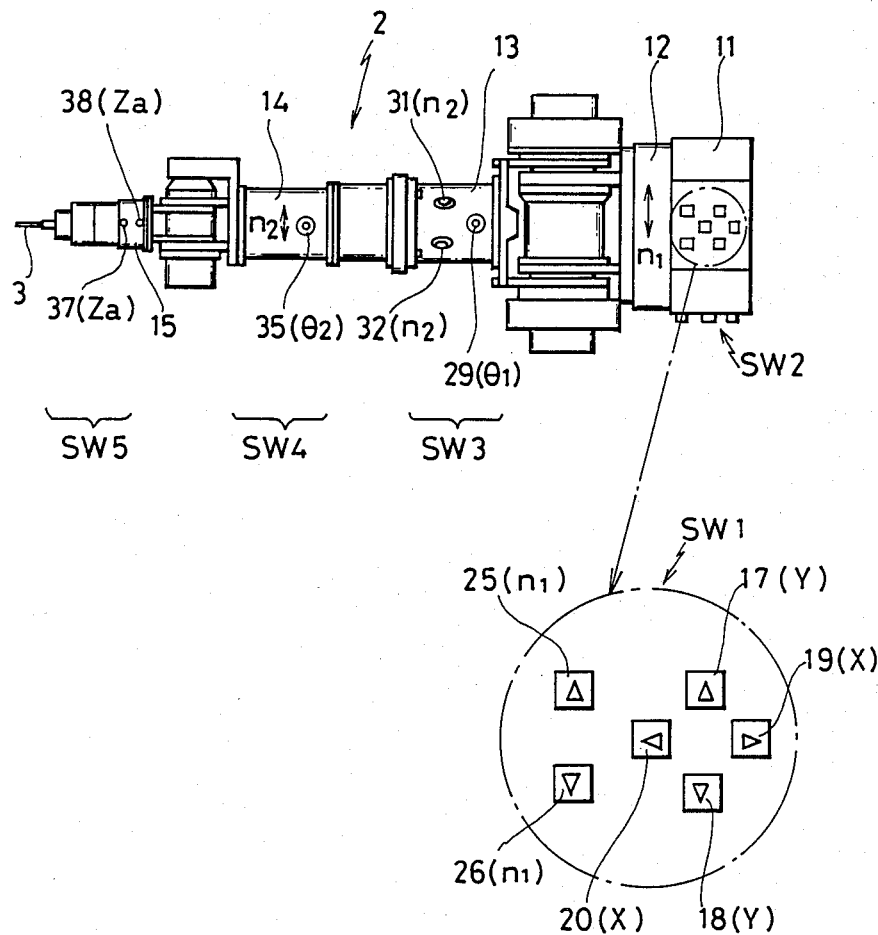
FIG. 2 is a front view showing only a multijoint arm of the robot of the present invention.
Figure 3:
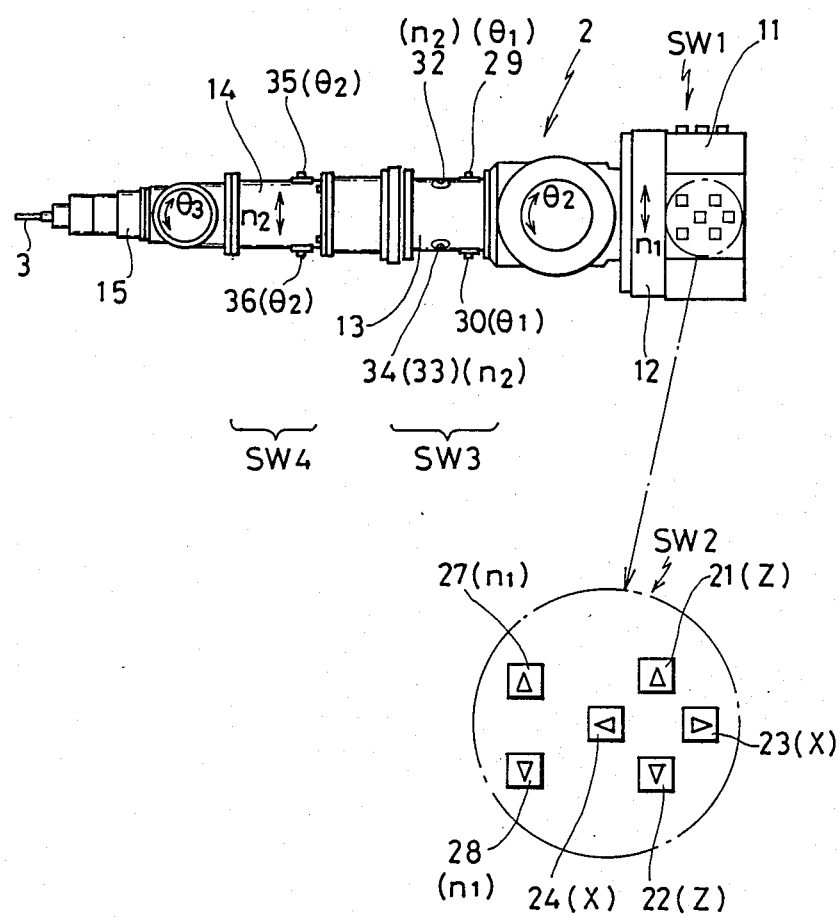
FIG. 3 is a side view showing the multijoint arm of the robot of the present invention.

FIG. 2 is a front view showing the multijoint arm 2 when seen from the right side in FIG. 1 and FIG. 3 is a side view showing the multijoint arm 2 when seen from above in FIG. 1, both when the multijoint arm 2 is pivoted through 90 degrees from the arm position shown in FIG. 1 (perpendicular to the paper surface in the same drawing).

In FIGS. 2 and 3, the numerals 17 to 38 denote all manipulation switches directly arranged at the multijoint arm 2. First group switches SW1 are arranged on the front surface of the end of the main arm 11 of the orthogonal three-axis actuating mechanism 1 as shown in FIG. 2. The first group switches SW1 include a pair of Y-axis (Y) switches 17 and 18 for driving the movable base 8 in the Y-axis direction in FIG. 1; a pair of X-axis (X) switches 19 and 20 for driving the main arm 11 in the X-axis direction in FIG. 1, and a pair of first rotation (n1) switches 25 and 26 for rotating the first rotary arm 12.

Second group switches SW2 are arranged on the side surface of the end of the main arm 11 of the orthogonal three-axis actuating mechanism 1 as shown in FIG. 3. The second group switches SW2 include a pair of Z-axis (Z) switches 21 and 22 for driving the head body 10 in the Z-axis direction in FIG. 1; a pair of other X-axis (X) switches 23 and 24 for driving the main arm 11 in the Y-axis direction in FIG. 1, and a pair of other first rotation (n1) switches 27 and 28 for rotating the first rotary arm 12.

Third group switches SW3 are arranged on the outer circumferential surface of the first pivotal arm 13 as shown in FIGS. 2 and 3. The third group switches SW3 include a pair of first pivotal ($\theta_1$) switches 29 and 30 for pivoting the first pivotal arm 13, and a pair of second rotary (n2) switches 31 and 32 and a pair of other second rotary (n2) switches 33 and 34 both for rotating the second rotary arm 14.

Fourth group switches SW4 are arranged on the outer circumferential surface of the second rotary arm 14 as shown in FIGS. 2 and 3. The fourth group switches include a pair of second pivotal ($\theta_2$) switches 35 and 36 for pivoting the second pivotal arm 15.

Fifth group switches SW5 are arranged on the outer circumferential surface of the second pivotal arm 15. The fifth group switches include a pair of probe Z-axis (Za) switches 37 and 38, for driving the probe 3 in the axial direction thereof. In this case, however, when one of these switches 37 and 38 is depressed, the probe 3 is moved simultaneously in the three (X, Y, Z) directions by the same predetermined distance (e.g. 1 cm) without changing the relative positional relationship between the movable base 8, the head boy 10 and the main arm 11.

As already explained, at least one-pair of switches are provided to drive, rotate or pivot an arm in either direction. For instance, when the switch 19 (X) is depressed, the main arm 11 is moved in the rightward direction; when the switch 20 (X) is depressed, the main arm 11 is moved in the leftward direction, for instance.

Further, when the first rotation (n1) switch 25 is depressed, the first rotary arm 12 is rotated clockwise; when the first rotation (n1) switch 26 is depressed, the first rotary arm 12 is rotated counterclockwise, for instance.

Further, the X-axis (X) switches 19 and 20, 23 and 24 are arranged on both the front and side surfaces of the arm 11 under double arrangement conditions for providing a more better switch manipulability. In the same way, the rotation (n1) switches 25 and 26, 27 and 28 are arranged on both the front and side surfaces of the main arm 11 under double arrangement conditions.

Each pair of these manipulation switches is connected to each of motor control circuits to actuate each arm of the robot in the two forward and reverse directions, respectively. In the case of a dc servomotor, in practice, the polarity of the voltage supplied to the motor is reversed from the positive polarity to the negative polarity or vice versa by depressing one of a pair of two switches. In the case of an ac servomotor, two of the three phase wires are selectively connected to the servomotor by depressing one of a pair of two switches.

By use of the above-mentioned various manipulating switches arranged on end surfaces of the main arm 11 of the orthogonal three-axis measurement mechanism 1 and on the outer surfaces of the multijoint arm 2, the probe 3 can be brought into contact with measurement points to implement robot teaching work more easily and quickly.

As described above, in the three-dimensional measuring robot of the present invention, since various manipulation switches are arranged on appropriate position of the orthogonal three-axis measurement mechanism and the multijoint arm in such a way that the switch arrangement positions well correspond to the robot arm movements, it is possible to implement robot teaching work skillfully, thus improving the teaching workability.

In addition, since the manipulation switches are arranged on the robot body, being different from the prior-art robot provided with a separate control unit connected to the robot body via a cable, it is unnecessary to carry a relatively heavy control unit or to connect the control unit to the robot body.

The second feature of the present invention is to provide the three-dimensional measuring robot provided with a probe direction setting apparatus.

When a major length of a slot or a diameter of a hole is required to measure, for instance, the probe of the robot is first inserted into the slot or the hole; the probe is moved horizontally into contact with the wall thereof along the major length; and the probe is moved horizontally again into contact with the opposite wall thereof along the minor length of the slot or the diameter of the hole in order to measure a distance between the two measurement points.

Therefore, in teaching operation, it is necessary to set the probe to any given movement direction on a plane perpendicular to the axial direction of the probe.

Figure 4:
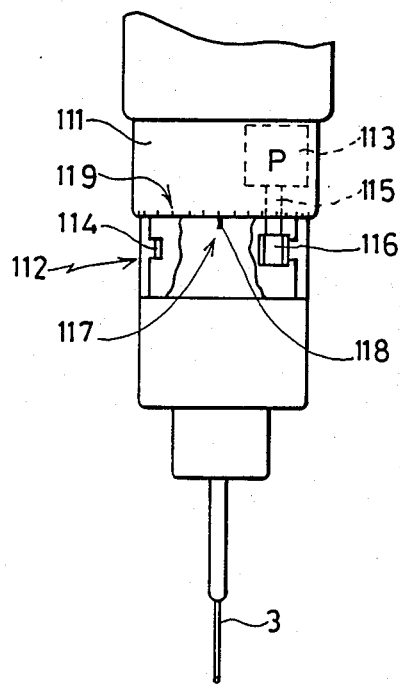
FIG. 4 is an enlarged view showing a probe and a probe mounting base member of the robot of the present invention.

FIG. 4 shows a probe mounting base member attached to an end of the multijoint arm 2. The probe direction setting apparatus of the present invention includes a rotary ring 112 rotatably fitted to the probe mounting base 111 coaxially therewith and a helical potentiometer 113 housed within the probe mounting base member 111. An inner circumferential gear 114 is formed on the inner circumferential surface of the rotary ring 112 so as to be in mesh with a pinion gear 116 fixed to an axle 115 of the helical potentiometer 113. Therefore, when the rotary ring 112 is rotated, the axle 115 of the helical potentiometer 113 is also rotated to change the resistance of the potentiometer 113. Further, an appropriate mark 117 is formed on the outer circumference of the rotary 112 and angle graduation marks 119 are formed on the outer circumference of the probe mounting base member 111. However, it is also possible to form the mark 117 on the probe mounting base member 111 and the angle graduation marks 119 on the rotary 112. Therefore, when the operator rotates the rotary ring 112 relative to the probe mounting base member 111, it is possible to set the probe direction on a plane perpendicular to the axial direction of the probe.

Further, it is preferable to set the mark 118 (zero degree reference position) formed on the rotary ring 112 to a direction along which the main arm 11 extends or contracts in the X-axis direction.

Figure 5:
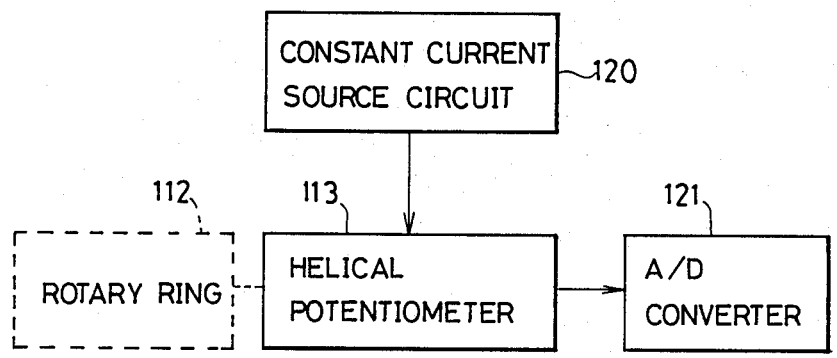
FIG. 5 is a block diagram showing a probe direction setting apparatus incorporated in the robot of the present invention.

FIG. 5 shows a block diagram of the probe direction setting apparatus of the present invention. In the drawing, a constant current is passed through the helical potentiometer 113 from a constant current source circuit 20, and an output voltage of the helical potentiometer 113 is analog-to-digital converted by an A/D converter 121. The digitalized voltage signal indicative of the angular position of the rotary ring 112 (i.e. the bent end 3A of the probe 3) is inputted to the controller 16 as teaching data. Further, the constant current source circuit 120 and the A/D converter 121 are both housed within the control unit 16.

Therefore, when the operator rotates the rotary ring 112 through $\theta$ degrees from the mark (zero) position to teach a direction in which the probe 3 is directed on a plane perpendicular to the vertical axis of the probe 3, since the axle 115 of the helical potentiometer 113 is also rotated to a corresponding angle via the gears 114 and 116, a resistance corresponding to the rotated angle is generated by the potentiometer 113. On the other hand, since a constant current is flowing through the potentiometer 113, it is possible to obtain a voltage output proportional to the potentiometer resistance. The obtained voltage output is digitalized by the A/D converter 121 and then inputted and stored in the computer (controller 16) as teaching data.

In the robot, it is possible to consider two, (x, y, z) and ($\alpha$, $\beta$, $\gamma$) coordinates. To measure the major length of a slot for instance, the probe 3 is first moved to a central point of a slot in accordance with (x, y, z) coordinates, and then the probe 3 is moved along the major axis of the slot. In this case, the $\alpha$-$\beta$ coordinates are set along the major axis of the slot by rotating the rotary ring 112. That is, the inclination angle of the $\alpha$-axis with respect to a reference position is determined by the rotary ring 112. In probe motion, the probe 3 is first set to the center of the slot and then moves along a determined direction (e.g. along the $\alpha$-axis) beginning from a predetermined point (x, y).

Further, when the probe is attached to the multijoint arm, since the mark position 118 changes relative to the reference position whenever the multijoint arm is moved, it is necessary to correct the reference position. That is, it is possible to teach the robot a probe horizontal movement direction beginning from a desired point by simply rotating the rotary ring 112 through a desired angle.

What is claimed is:
1. A three-dimensional measuring robot, comprising:
  (a) an orthogonal three-axis actuating mechanism having a main arm, for moving the main arm in three orthogonal directions;
  (b) a multijoint arm including at least one rotary arm and one pivotal arm and attached to an end of said orthogonal three-axis actuating mechanism;
  (c) a probe attached to an end of said multijoint arm, for detecting an object to be measured when brought into contact with the object;
  (d) a plurality of manipulation switches arranged on an end of the main arm of said orthogonal three-axis actuating mechanism and on outer surfaces of the rotary and pivotal arms of said multijoint arm; and
  (e) control means for storing data indicative of positions of the main, rotary and pivotal arms in teaching operation, when said probe is brought into contact with the object by use of said manipulation switches, and controlling movement of the plural arms on the basis of the stored data in playback operation.

2. The three-dimensional measuring robot of claim 1, wherein said manipulation switches comprises a plurality of pairs of switches, each pair of switches being so arranged as to correspond to two opposite movement directions of each arm.

3. The three-dimensional measuring robot of claim 2, wherein said manipulation switches comprises a first group including a pair of first switches for moving the main arm in a first (X) direction; a pair of second switches for moving the main arm in a second (Y) direction; and a pair of third switches (n1) for rotating the rotary arm, said first group switches being arranged on a front surface of an end of the main arm.

4. The three-dimensional measuring robot of claim 2, wherein said manipulation switches comprises a second group including a pair of fourth switches for moving the main arm in a first (X) direction; a pair of fifth switches for moving the main arm in a third (Z) direction; and a pair of sixth switches (n1) for rotating the rotary arm, said second group switches being arranged on a side surface of an end of the main arm.

5. The three-dimensional measuring robot of claim 2, wherein said manipulation switches comprises a third group including a pair of seventh switches ($\theta_1$) for pivoting the pivotal arm and eighth switches (n2) for rotating the rotary arm, said third group switches being arranged on the outer surface of the pivotal arm.

6. The three-dimensional measuring robot of claim 2, wherein said manipulation switches comprises a pair of ninth switches (Za) for moving the probe in three orthogonal directions by a predetermined distance simultaneously.

7. The three-dimensional measuring robot of claim 1, which further comprises probe direction setting means attached to an end of said multijoint arm, for setting a direction of said probe, which comprises:
(a) a probe mounting base attached to an end of said multijoint arm and formed with angle graduation marks;
(b) a rotary ring rotatably fitted to said probe mounting base and formed with a reference mark;
(c) a helical potentiometer driven by said rotary ring;
(d) a constant current source circuit for passing a constant current through said helical potentiometer; and
(e) an analog-to-digital converter for converting an analog voltage of said helical potentiometer into a digital signal, the digital signal being stored in teaching operation.

* * * * *